United States Patent [19]
Schwarz et al.

[11] Patent Number: 5,946,156
[45] Date of Patent: Aug. 31, 1999

[54] TAPE SERVO SYSTEM AND METHODS, WRITE/READ HEADS, AND SERVO TRACK CONFIGURATIONS REGARDING SAME

[75] Inventors: Theodore A. Schwarz, Woodbury; Robert J. Youngquist, White Bear Lake; Hung T. Tran, Woodbury, all of Minn.

[73] Assignee: Imation Corp., Oakdale, Minn.

[21] Appl. No.: 08/811,390

[22] Filed: Mar. 4, 1997

[51] Int. Cl.$^6$ .................................................. G11B 21/02
[52] U.S. Cl. .......................................... 360/75; 360/78.02
[58] Field of Search .................... 360/75, 77.12, 360/78.02

[56] References Cited

U.S. PATENT DOCUMENTS

| | | | |
|---|---|---|---|
| 3,576,553 | 4/1971 | Hertrich | 340/174.1 |
| 3,864,741 | 2/1975 | Schwarz | 360/77 |
| 4,152,736 | 5/1979 | Jansen et al. | |
| 4,409,628 | 10/1983 | Frimet et al. | 360/73 |
| 4,414,589 | 11/1983 | Oliver et al. | 360/77 |
| 4,422,111 | 12/1983 | Moeller et al. | 360/72.1 |
| 4,472,750 | 9/1984 | Klumpp et al. | 360/78 |
| 4,530,019 | 7/1985 | Penniman | 360/77 |
| 4,539,607 | 9/1985 | Fujiki | 360/77 |
| 4,586,094 | 4/1986 | Chambors et al. | 360/77 |
| 4,616,272 | 10/1986 | Moriyama | |
| 4,642,709 | 2/1987 | Vinal | 360/77 |
| 4,646,175 | 2/1987 | Sokolik et al. | 360/78 |
| 4,866,548 | 9/1989 | Rudi | 360/77.02 |
| 4,903,151 | 2/1990 | Mizukami et al. | 360/78.01 |

(List continued on next page.)

FOREIGN PATENT DOCUMENTS

| | | |
|---|---|---|
| 41 16 896 | 11/1992 | Germany . |
| 60-43273 | 3/1985 | Japan . |
| 1-119914 | 5/1989 | Japan . |
| 2-094019 | 4/1990 | Japan . |
| 2-172014 | 7/1990 | Japan . |
| 192439 | 7/1995 | Japan . |
| WO 93/17420 | 9/1993 | WIPO . |
| WO 94/12975 | 6/1994 | WIPO . |

OTHER PUBLICATIONS

W. McCormick, "Multielement Servoing Head", *IBM Technical Disclosure Bulletin*, 17(4), pp. 979–980 (1974).
T. Schwarz, "Re–recordable Servo System for Multi–Track Tape", *IBM Technical Disclosure Bulletin*, 25(2), pp. 778–779 (1982).

*Primary Examiner*—Nabil Hindi
*Attorney, Agent, or Firm*—Eric D. Levinson

[57] ABSTRACT

A tape servo system includes tape having bands of tracks including at least one data band having a plurality of data tracks of track pitch P and a servo band dedicated for servo information. The servo band includes two or more noncontiguous servo tracks with each pair of adjacent servo tracks of the two or more noncontiguous servo tracks having a center to center separation equal to M*P, wherein M for each pair of adjacent servo tracks may be any integer $\geq 2$. The system may further include a head assembly having a single magnetoresistive read element tapped to provide at least (K+1) tapped servo read elements for use in reading servo information written to the servo band; wherein K is equal to the integer M for the pair of adjacent servo tracks having the greatest center to center separation and a repositioning assembly for repositioning the head assembly as a function of the servo information. Further, the center to center separation between pairs of adjacent servo tracks of the two or more noncontiguous servo tracks may be different for at least two pairs of adjacent servo tracks. A servo tracking data recording tape with two or more noncontiguous servo tracks having center to center separation between pairs of adjacent servo tracks being different for at least two pairs of adjacent servo tracks is also provided along with a method for servo track identification for use therewith. Further, track read/write head assemblies wherein the servo read and write elements are along the same gap lines as the data read and write assemblies, respectively, are provided.

41 Claims, 11 Drawing Sheets

U.S. PATENT DOCUMENTS

| | | | |
|---|---|---|---|
| 4,975,791 | 12/1990 | Eggebeen | 360/77.01 |
| 4,977,472 | 12/1990 | Volz et al. | 360/78.14 |
| 4,979,051 | 12/1990 | Eggebeen | 360/21 |
| 4,996,609 | 2/1991 | Joannou | 360/57 |
| 5,008,765 | 4/1991 | Youngquist | 360/77.12 |
| 5,079,663 | 1/1992 | Ju et al. | 360/113 |
| 5,121,270 | 6/1992 | Alcudia et al. | 360/77.01 |
| 5,187,699 | 2/1993 | Raaymakers et al. | 369/48 |
| 5,196,969 | 3/1993 | Iwamatsu et al. | 360/75 |
| 5,210,660 | 5/1993 | Hetzler | 360/51 |
| 5,229,895 | 7/1993 | Schwarz et al. | 360/77.12 |
| 5,262,908 | 11/1993 | Iwamatsu et al. | 360/77.12 |
| 5,331,493 | 7/1994 | Schwarz | 360/113 |
| 5,367,414 | 11/1994 | Kelly et al. | 360/77.12 |
| 5,377,057 | 12/1994 | Solhjell | 360/75 |
| 5,379,165 | 1/1995 | Pahr | 360/78.02 |
| 5,384,671 | 1/1995 | Fisher | 360/51 |
| 5,394,277 | 2/1995 | Pahr et al. | 360/78.02 |
| 5,396,376 | 3/1995 | Chambors et al. | 360/48 |
| 5,396,380 | 3/1995 | Shimizu et al. | 360/78.14 |
| 5,418,670 | 5/1995 | McClure et al. | 360/131 |
| 5,424,882 | 6/1995 | Kazawa | 360/46 |
| 5,426,543 | 6/1995 | Dy et al. | 360/77.12 |
| 5,432,652 | 7/1995 | Comeaux et al. | 360/77.12 |
| 5,448,430 | 9/1995 | Bailey et al. | 360/77.12 |
| 5,450,257 | 9/1995 | Tran et al. | 360/76 |
| 5,452,150 | 9/1995 | Henneberger et al. | 360/74.4 |
| 5,453,887 | 9/1995 | Negishi et al. | 360/77.1 |
| 5,488,525 | 1/1996 | Adams et al. | 360/104 |
| 5,541,793 | 7/1996 | Schwarz | 360/121 |
| 5,574,602 | 11/1996 | Baca et al. | 360/77.12 |
| 5,617,269 | 4/1997 | Gordenker et al. | |
| 5,675,448 | 10/1997 | Molstad et al. | 360/77.12 |
| 5,726,824 | 3/1998 | Ayres et al. | 360/77.12 |

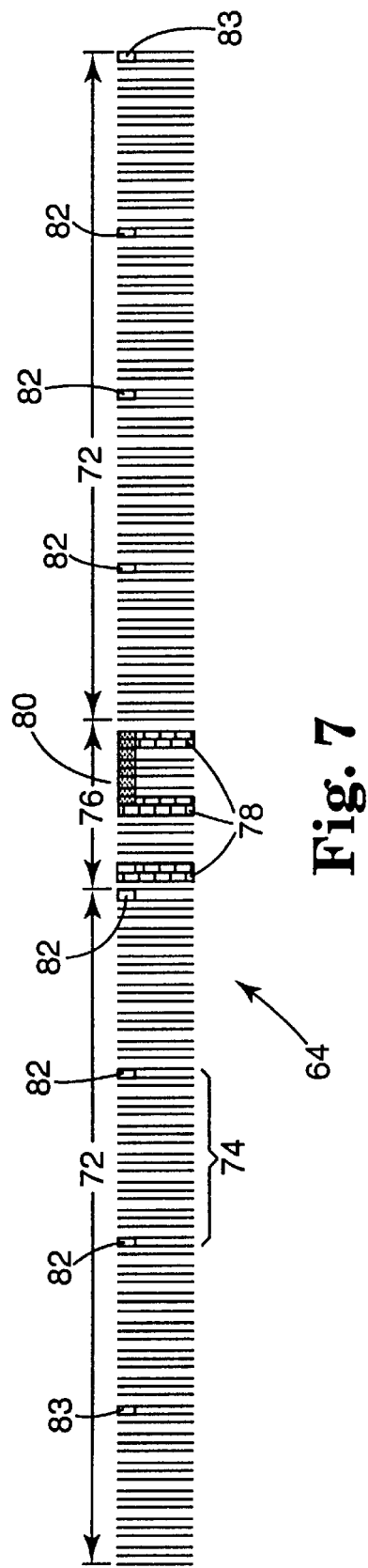

TAPE SERVO SYSTEM AND METHODS, WRITE/READ HEADS, AND SERVO TRACK CONFIGURATIONS REGARDING SAME

FIELD OF THE INVENTION

The present invention relates to tape servo tracking. More particularly, the present invention relates to tape servo systems and methods, servo track configurations, and read/write heads utilized therewith.

BACKGROUND OF THE INVENTION

It is common to provide magnetic tape write/read head assemblies having one or more write/read transducer heads positioned transverse to the intended path of a magnetic recording medium, i.e., tape, for writing data on and reading data from parallel tracks on the tape. It is also known to include servo information on at least some of the tracks and provide servo transducer heads for reading such information to enable control of the lateral position of the head assembly, thereby dynamically maintaining the respective transducer heads of the head assembly relative to tape tracks. With the use of servo control, data track widths can be made significantly narrower and the capacity of the recording medium can therefore be increased.

Various techniques for providing the servo information contained in tracks, i.e., servo tracks, have been previously employed. For example, it is known to provide dedicated servo tracks on the medium at the time of manufacture. However, it is desirable to enable an end-user to write a servo pattern on the medium in the field as opposed to factory writing of servo information. This allows the end-user to add the servo information to either a blank medium or utilize a medium which was either intentionally or unintentionally erased.

There are a substantial number of different servo track configurations for providing servo control. For example, some of the different configurations are generally characterized by the utilization of either alternating information containing tracks embedded on an erased band and a single head or a center tapped head, as shown in FIG. 1, or alternating tracks with different distinguishable characteristics such as one or more discrete monofrequencies and a single head or a center tapped head, such as shown in FIG. 2. As shown in FIG. 1, a single servo transducer 14 is utilized for sensing servo information on the alternating servo tracks 12 in servo band 10 on an erased background for use in positioning data heads 19 within the data bands 18. Alternatively, a center tapped head 16 may be utilized for providing position error signals as a function of the position of the head 16 over the tracks 12 within the servo band 10.

As shown in FIG. 2, a single servo head 24 may be utilized for providing servo information from alternating servo tracks 22 within servo band having different distinguishable characteristics. The information is then used to position the data heads 29 correctly within the data bands 28 for performing read and/or write functions. Alternatively, a center tapped head (or two servo transducer elements) 26 may be utilized to generate a position error signal from the servo information recorded within the servo band 20.

However, these different servo configurations have ambiguity associated with identifying which servo track is being used for deriving the position error signal to provide for servo control of the system. Although the servo track provides adequate positioning information, it does not provide any information as to which servo track the servo head is currently utilizing to generate the position error signal for servo control. Therefore, if the servo transducer is unintentionally repositioned, a misidentification of the servo track being used for servo positioning of the data read/write heads occurs.

Various configurations attaining some improvement with respect to the above configurations are shown in FIGS. 3, 4, and 5, wherein multiple heads are utilized for generating positioning information from the servo information written in the servo band. As shown in FIG. 3, multiple heads 32 are utilized for reading servo information from a servo track 34 recorded in servo band 30 for positioning data heads 36 within the data bands 38. Further, as shown in FIG. 4, multiple servo heads 42 are utilized for reading servo information from a pair of distinguishable servo tracks 44 within servo band 40 to position data heads 46 within data bands 48.

The above configurations either rely on a single servo track utilizing multiple servo heads (wherein the number of heads is at least N−2 and N is the number of data tracks in a data band), rely on a pair of distinguishable servo tracks which also requires the use of at least N−2 servo heads, or rely on a set of alternating distinguishable tracks which fill the servo bands. With the use of multiple heads and a single servo track or a pair of distinguishable servo tracks (FIGS. 3 and 4), an undesirable large number of servo heads is necessary. With regard to the latter multiple alternating distinguishable tracks, such tracks are very difficult to write in situ in a tape drive.

For example, in writing multiple distinguishable tracks, servo write heads may not be placed adjacent to one another. Therefore, when servo tracks are written contiguous with one another as in the pair of alternating distinguishable servo tracks (FIG. 4) and set of multiple alternating distinguishable servo track (FIG. 2) configurations, it is required that they be written on multiple passes or with heads along multiple gap lines. For precision writing, this typically requires that the pattern be written in the factory. In many cases it is desirable to write servo information in the field. Further, although with the use of multiple alternating distinguishable tracks written across the servo band, the number of servo heads necessary is reduced to one or two heads, the problem of ambiguity in servo track identification is still applicable.

In another servo configuration which utilizes multiple spaced heads as shown in FIG. 5 (extracted from U.S. Pat. No. 5,262,908, to Iwamatsu et al., issued Nov. 16, 1993), multiple heads 52 are utilized for reading information from a plurality of spaced servo tracks 54 within servo band 50 for positioning data read/write heads 56 within data bands 58. However, with respect to such a configuration and the other configurations as described above which use multiple servo heads, it is difficult to produce head assemblies that include such multiple servo heads. Particularly, in thin film heads, limited space is allotted between adjacent data bands and therefore, space is limited for the leads from each of the multiple servo heads. In high track density heads, such leads are much larger than the width of the track pitch. As such, production of such multiple heads in the head assembly in such thin film heads is difficult.

For the above reasons and other reasons that will be apparent from the description below, alternatives to the configurations such as those described above are needed to overcome difficulties associated therewith. For example, the unambiguous identification of individual servo tracks is desired. Further, it is desired to reduce the number of servo heads necessary for providing servo control and also it is desirable to write servo tracks in the field in a single pass.

SUMMARY OF THE INVENTION

A tape servo system in accordance with the present invention includes tape having a plurality of bands of tracks. The plurality of bands of tracks include at least one data band having a plurality of data tracks of track pitch P and a servo band dedicated for servo information. The servo band includes two or more noncontiguous servo tracks with each pair of adjacent servo tracks of the two or more noncontiguous servo tracks having a center to center separation equal to M*P, wherein M for each pair of adjacent servo tracks may be any integer $\geq 2$. The system further includes a head assembly having a single magnetoresistive read element tapped to provide at least (K+1) tapped servo read elements for use in reading servo information written to the servo band; wherein K is equal to the integer M for the pair of adjacent servo tracks having the greatest center to center separation. A repositioning assembly of the system repositions the head assembly as a function of the servo information read from the servo band using the servo read elements.

In one embodiment of the system, each data band includes N data tracks, the number of servo read elements is equal to H, the number of servo tracks is equal to S, and further $S*(H-1) \geq N$. In another embodiment of the system, the center to center separation between pairs of adjacent servo tracks of the two or more noncontiguous servo tracks is different for at least two pairs of adjacent servo tracks. In yet another embodiment of the system, the head assembly includes a plurality of servo write elements for identically writing the plurality of servo tracks in a single pass; the servo write elements having the same gap line as the data write elements.

Another tape servo system in accordance with the present invention includes tape having a plurality of bands of tracks. The plurality of bands of tracks include at least one data band having a plurality of data tracks of track pitch P and a servo band dedicated for servo information. The servo band includes two or more noncontiguous servo tracks with each pair of adjacent servo tracks of the two or more noncontiguous servo tracks having a center to center separation equal to M*P, wherein M is any integer $\geq 2$. The center to center separation between pairs of adjacent servo tracks of the two or more noncontiguous servo tracks is different for at least two pairs of adjacent servo tracks. The system further includes a head assembly including a plurality of servo read elements (H) for use in reading servo information written to the servo band. The number of servo read elements (H) is equal to at least K+1, wherein K is the number of track pitches between the centers of the two servo tracks of a pair of adjacent servo tracks having the greatest center to center separation. A repositioning assembly of the system repositions the head assembly as a function of the servo information read from the servo band using the plurality of servo read elements.

A servo tracking data recording tape in accordance with the present invention is also described. The tape includes at least one data band having a plurality of data tracks of track pitch P and a servo band dedicated for servo information. The servo band includes two or more noncontiguous servo tracks with each pair of adjacent servo tracks of the two or more noncontiguous servo tracks having a center to center separation equal to M*P, wherein M is any integer $\geq 2$. The center to center separation between pairs of adjacent servo tracks of the two or more noncontiguous servo tracks is different for at least two pairs of adjacent servo tracks.

In various embodiments of the systems and tape described above, the center to center separation between pairs of adjacent servo tracks is different for each pair of servo tracks across the servo band. Further, the separation between pairs of adjacent servo tracks may be different by one or more track pitches from one pair of servo tracks to a subsequent pair of servo tracks across the servo band, and yet further, the center to center separation between pairs of adjacent servo tracks may monotonically increase by one track pitch from one pair of servo tracks to a subsequent pair of servo tracks across the servo band.

A system for writing servo track information within a servo band of a tape in accordance with the present invention is also described. The writing system includes tape including a plurality of bands of tracks. The plurality of bands of tracks include at least one data band having a plurality of data tracks of track pitch P and a servo band dedicated for servo information. The system further includes a head assembly including a plurality of data write elements and a servo writer having the same gap line as the plurality of data write elements. The servo writer writes two or more noncontiguous servo tracks in the servo band with each pair of adjacent servo tracks of the two or more noncontiguous servo tracks having center to center spacing equal to M*P, wherein M for each pair of adjacent servo tracks may be any integer $\geq 2$.

In one embodiment of the system, the head assembly further includes a servo erase head along another gap line for erasing the servo band.

A method of servo track identification in accordance with the present invention includes spacing a plurality of noncontiguous servo tracks such that pairs of adjacent servo tracks have a center to center separation therebetween that is different for at least two pairs of adjacent servo tracks of the plurality of noncontiguous servo tracks. The method further includes sensing whether servo read elements of at least one pair of adjacent servo read elements are positioned proximate to the center of at least one of the servo tracks.

In one embodiment of the method, the number of servo read elements is equal to at least K+1, wherein K is the number of track pitches between the centers of two servo tracks of a pair of adjacent servo tracks of the plurality of noncontiguous servo tracks having the greatest center to center separation. In another embodiment of the method, the method further includes comparing the sensed information to a predetermined algebraic code identifying each servo track.

A method of reading servo information is also described. The method includes providing a tape including a plurality of bands of tracks. The plurality of bands of tracks include at least one data band having a plurality of data tracks of track pitch P and a servo band dedicated for servo information. The servo band includes two or more noncontiguous servo tracks with each pair of adjacent servo tracks of the two or more noncontiguous servo tracks having a center to center spacing equal to M*P, wherein M for each pair of adjacent servo tracks may be any integer $\geq 2$. A tapped single magnetoresistive read element is positioned proximate the tape to provide K+1 tapped servo read element signals representative of K+1 servo read elements, wherein K is equal to an integer M of the pair of adjacent servo tracks having the greatest center to center separation. The method further includes cycling selectively through the K+1 tapped servo read element signals representative of the tapped servo read elements to provide a pair of outputs representative of the position of adjacent servo read elements of the tapped servo read elements relative to one or more of the noncontiguous servo tracks and comparing the pair of outputs to determine a position error signal as a function thereof.

A head assembly in accordance with the present invention includes a plurality of data write elements along a first gap line, a plurality of data read elements along a second gap line, a single pass servo writer including servo write elements along the first gap line, and a single magnetoresistive servo read element tapped to provide a plurality of segmented servo read elements embedded between the plurality of data read elements along the second gap line.

In one embodiment of the head assembly, the assembly further includes a servo erase element along a third gap line.

Other head assemblies are also described including a head assembly having a plurality of data write elements along a write gap line and a single pass servo writer including servo write elements along the write gap line for writing two or more noncontiguous servo tracks. Yet another head assembly includes a single magnetoresistive read element and leads for tapping the single magnetoresistive read element at a spacing equal to a data track pitch with which the head assembly is utilized to provide at least three segmented servo read elements.

BRIEF DESCRIPTION OF THE DRAWINGS

FIG. 1 is a configuration including alternating servo tracks on an erased background. FIG. 2 is a servo configuration including alternating servo tracks with different distinguishable signal characteristics. FIG. 3 is a servo configuration including a single servo track utilizing multiple servo heads. FIG. 4 is a pair of distinguishable servo tracks with the use of multiple servo heads. FIG. 5 is a servo configuration including multiple spaced servo tracks and multiple servo heads.

FIG. 7 is a more detailed view of the tape of FIG. 6 in accordance with the present invention.

DETAILED DESCRIPTION OF THE EMBODIMENTS

Figure 1:
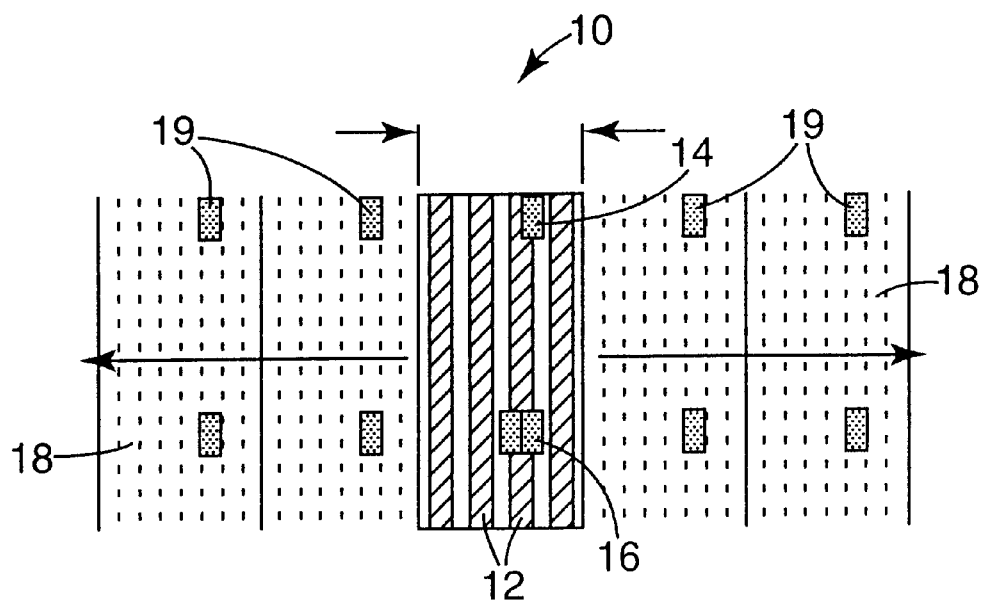
FIGS. 1–5 are various prior art servo system configurations.
Figure 2:
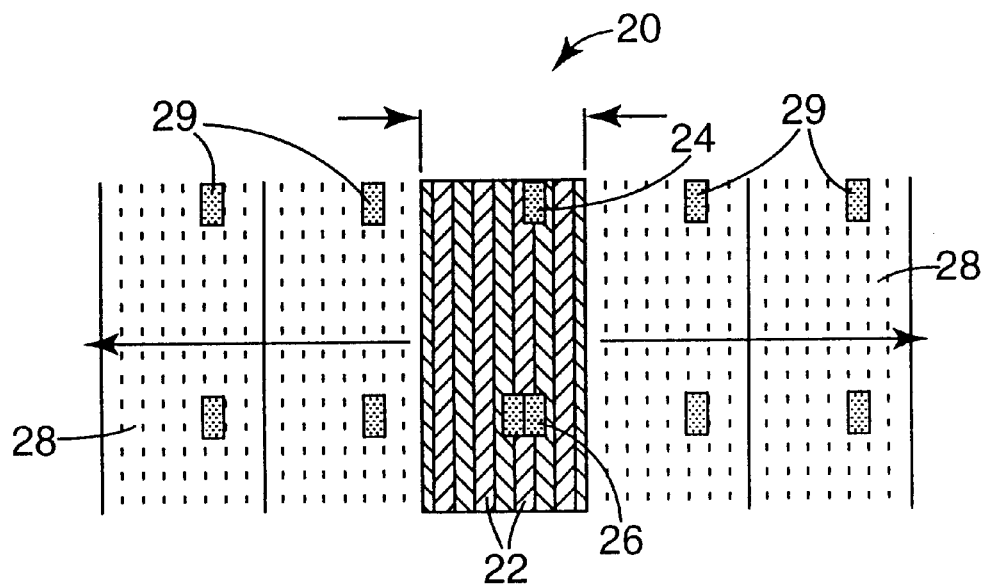
Figure 3:
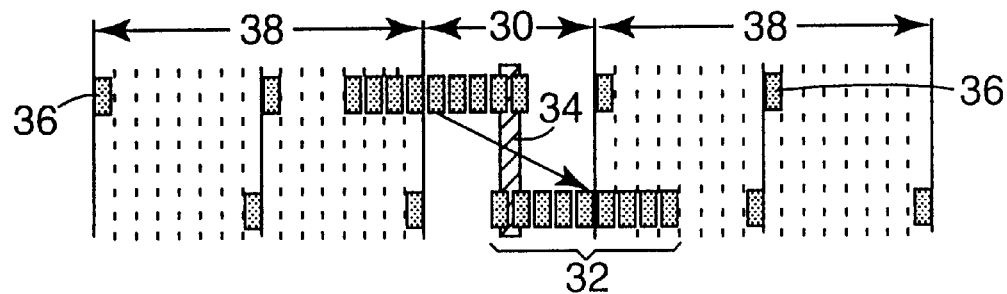
Figure 4:
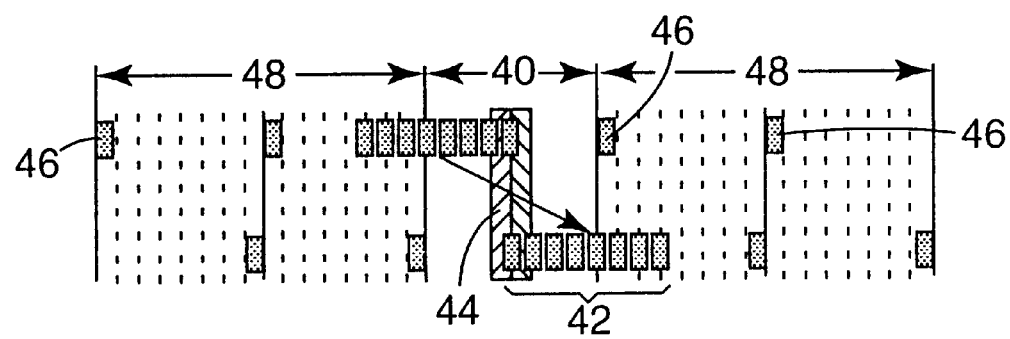
Figure 5:
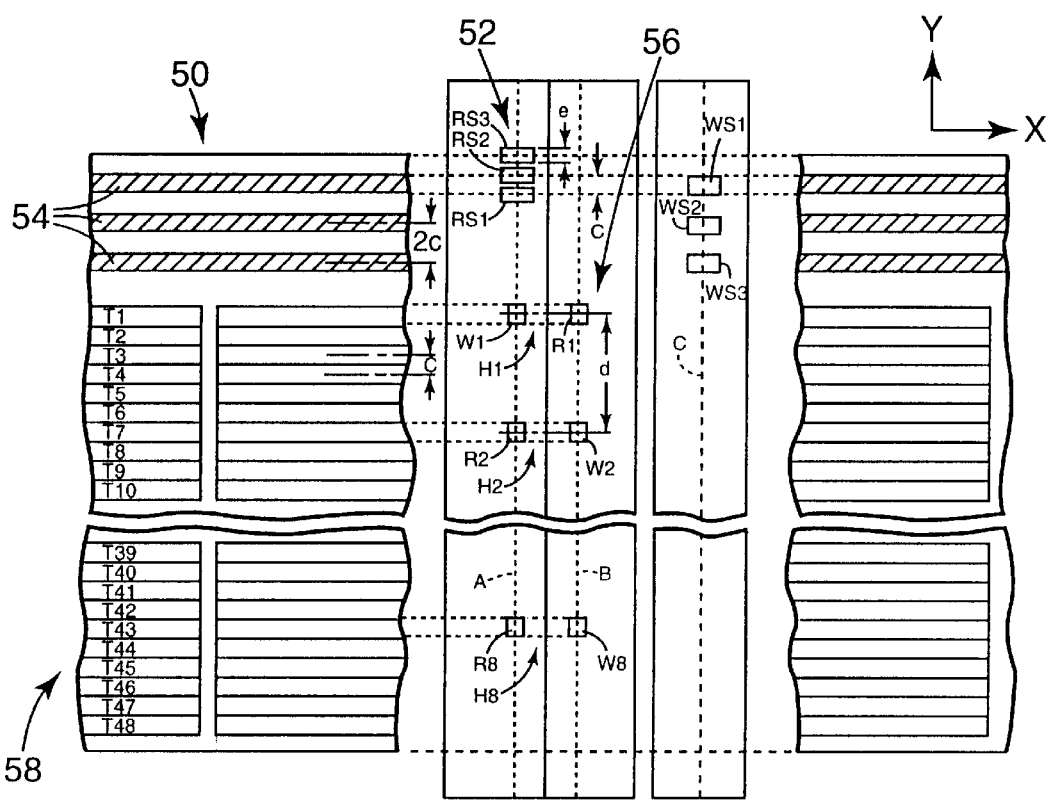
Figure 6:
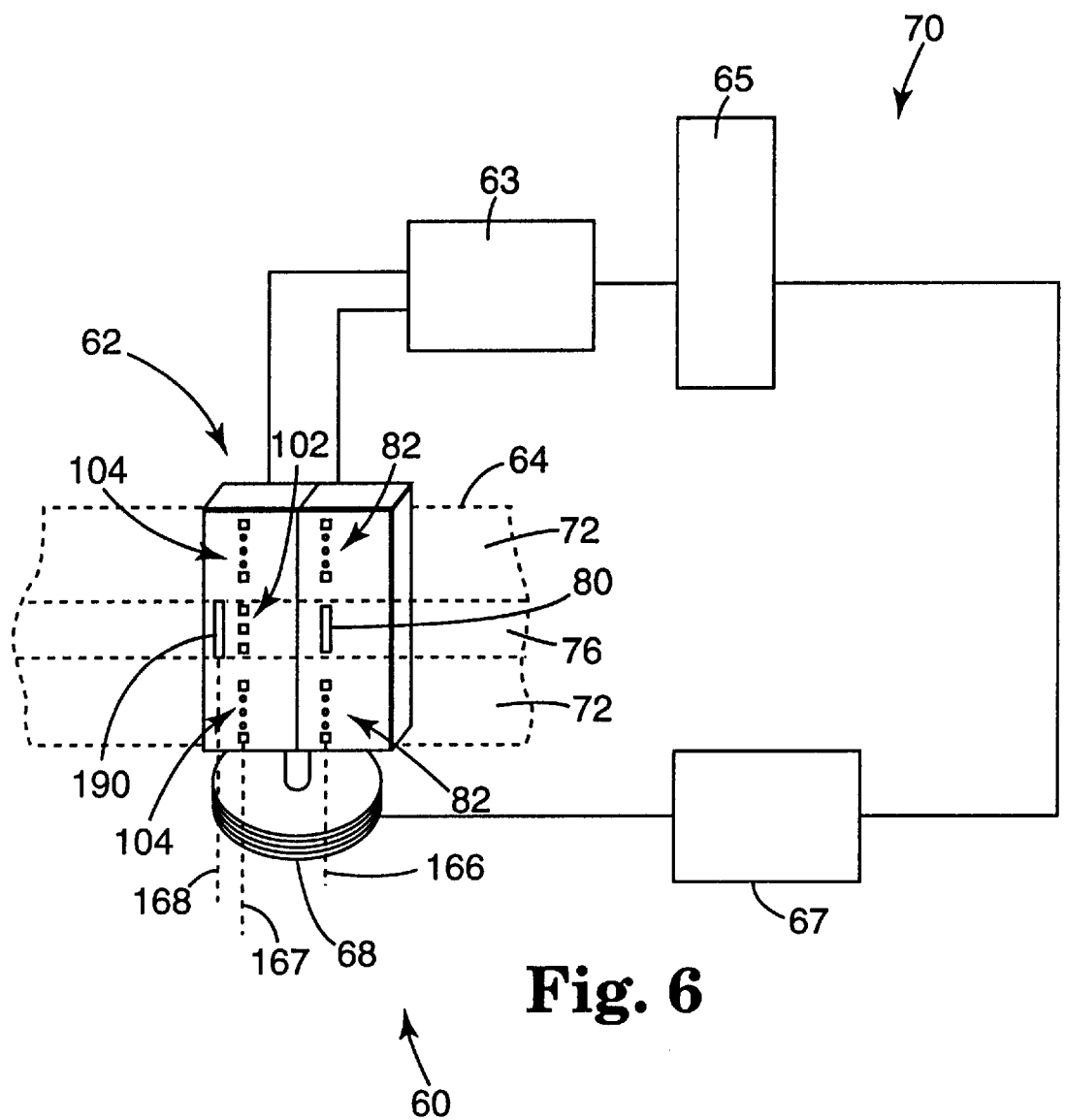
FIG. 6 is a schematic illustration of a tape servo system in accordance with the present invention.

FIG. 6 schematically illustrates a closed loop tape servo system 60 for use in reading and writing to magnetic tape 64. The tape servo system 60 includes a head assembly 62 positionable transversely relative to the length of tape 64 by positioning actuator 68. Servo information recorded in a servo band 76 of tape 64 is accessed utilizing head assembly 62 which includes a single tapped magnetoresistive read element 80 and multiple data read elements 82 along a common gap line 166, multiple servo write elements 102 and multiple data write elements 104 along a second common gap line 167, and a servo erase element 190 along a third gap line 168.

The head assembly 62, is capable of writing servo track configurations in accordance with the present invention in a single pass. Further, the head assembly 62 provides signals representative of the position of the tapped servo read elements of the single tapped magnetoresistive read elements 80 relative to servo tracks in servo band 76 to servo read circuitry 63 of position error signal generating circuitry 70. Servo read circuitry 63 generates outputs representative of servo information in the servo band for use by processing unit or control logic 65 which generates a position error signal command based on the servo information from the servo read circuitry 63.

The head assembly 62 is then positioned by positioning actuator 68 in response to a position error signal command conditioned by conditioning circuitry 67, such as an amplifier, to move the head assembly 62 such that alignment of the tapped servo read elements of the single magnetoresistive element 80 and servo tracks in the servo band 76 is achieved. Thereby, positioning of data read elements 82 and/or data write elements 104 are correctly positioned for reading and writing data to data tracks of individual data bands within the groups of data bands 72 of tape 64.

Generally, the servo system 60 can employ servo write elements and servo read elements in the same gap lines as the data write and read elements, respectively. However, various concepts in accordance with the present invention are equally applicable to the use of multiple elements provided along separate gap lines, multiple elements provided by multiple spaced read elements as opposed to a tapped single magnetoresistive element, head assemblies including only servo read elements without servo write elements (i.e., the servo information written at the factory), head assemblies not including a servo erase element (i.e., field servo writing only possible on a pre-erased servo band), and various other head assemblies as would be readily apparent to one skilled in the art.

As is described further below with reference to the alternate servo track configurations of FIGS. 14–16, the present invention contemplates the use of unique patterns of noncontiguous identical, i.e., monofrequency, servo tracks written on an erased servo band of the tape 64. More particularly, the unique patterns are provided with multiple spacing arrangements between the servo tracks. The unique patterns are selected in order to minimize servo track identification ambiguity and to minimize the number of servo read elements required to achieve servo control.

As shown in FIG. 7, the tape 64 is divided into an integral number of groups of bands of tracks including groups of data bands 72. Within each group of data bands 72, each of the tracks is dedicated to a specific individual data band such as data band 74. One of the bands of tape 64, typically the center band, is dedicated for servo information and is shown in FIG. 7 as servo band 76. The servo band 76 is centered between the groups of data bands 72. However, it is not necessary for the servo band 76 to be centered between the data bands as it could be positioned towards one edge of the tape or the other edge of the tape, or further could be positioned at one tape edge or the other tape edge. However, preferably the servo band 76 is centered to decrease tracking tolerances resulting from tape related track displacement due to, for example, tape contraction or expansion resulting from environmental change or ageing. The center positioning decreases the distance between the servo read elements 80 and the furthest most data elements 83 (FIG. 7). In each of the individual data bands 74, the data tracks are contiguous, e.g., the data tracks are directly adjacent one another.

Figure 8A:
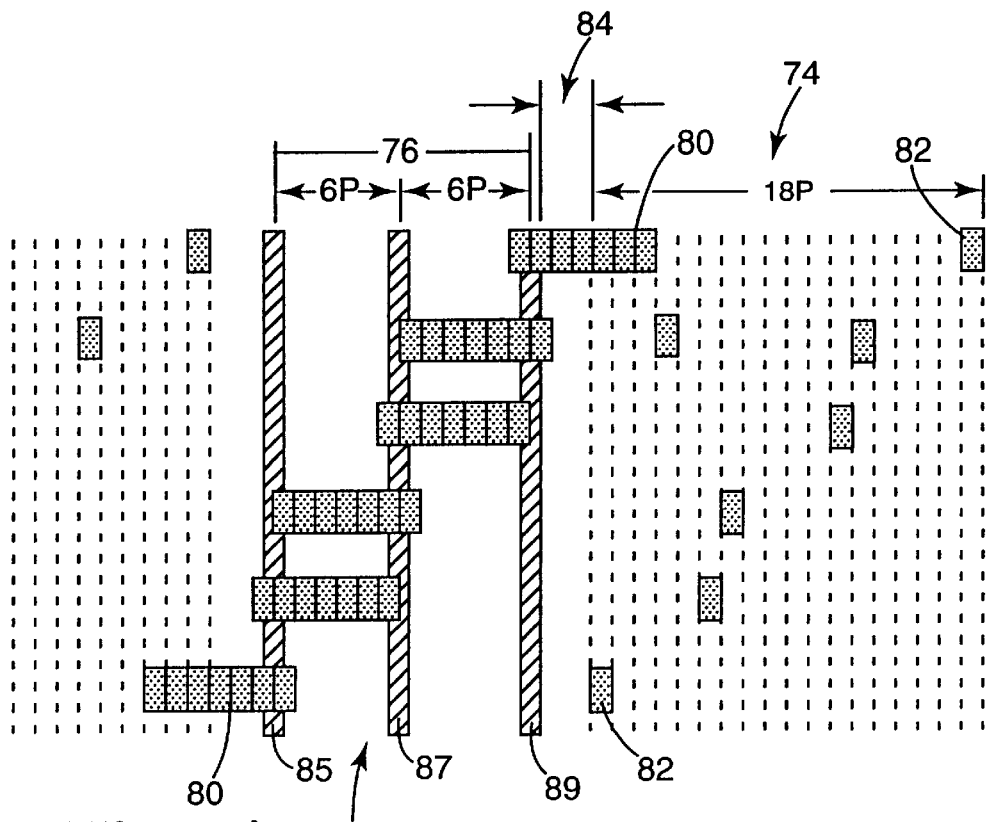
FIG. 8A is a detailed illustration of the servo band and a portion of the data bands as shown in FIG. 7.

As shown in the more detailed view of the servo band 76 in FIG. 8A, servo band 76 includes two or more noncontiguous servo tracks, e.g., noncontiguous servo tracks being servo tracks which are physically separated by more than one-half track pitch P, in other words, are not directly adjacent to one another. Generally, in accordance with the present invention, the tape 64 includes a predetermined number of individual data bands 74 having a particular number of data tracks therein of track pitch P. Further, the tape 64 includes servo band 76 dedicated for the servo information with the servo band 76 including two or more noncontiguous servo tracks 78, such as identically written servo tracks 85, 87, and 89. The center to center spacing between adjacent servo tracks, such as, for example, servo track 85 and servo track 87 as shown in FIG. 8A, is equal to M*P, wherein M may be any integer greater than or equal to 2. In the present invention, each servo track has a width that is equal to about the track pitch P. Preferably, the width is slightly greater than P, for example, 1.1P or less. As such, the width of the servo tracks need not be equivalent to the track pitch P.

The head assembly 62 of servo system 60 for use in reading the servo information from the servo band 76 includes multiple servo read elements which can be configured as a single magnetoresistive element tapped at the data track pitch, as shall be described in further detail below. In general, with S being the number of servo tracks, N being the number of data tracks in an individual data band 74, H being the minimum number of servo read elements 80 necessary for reading the servo tracks 78 in accordance with the present invention, then the relationship between the number of servo tracks in the servo band 76 and the minimum number of servo read elements 80 is given by: S*(H−1)≧N. The minimum number (H) of servo read elements 80 in accordance with the present invention is equal to K+1, wherein K is equal to the integer M with M being the number of data track pitches between the centers of a pair of adjacent servo tracks, such as servo tracks 85 and 87 or tracks 87 and 89 (FIG. 8A).

In the illustrative embodiment of the servo track and servo read element configuration, FIG. 8A shows the utilization of three noncontiguous servo tracks 85, 87, and 89. Each pair of servo tracks is separated by six data track pitches. For example, servo track pair 85 and 87 is separated center to center by six data track pitches and servo track pair 87 and 89 is separated center to center by six data track pitches. The configuration shown in FIG. 8A contains eighteen data tracks in an individual data band 74 and therefore, in this particular illustrative embodiment, N=18, S=3, M=6, and H=at least 7. It should be readily apparent to one skilled in the art that such numbers may vary, including the number of data bands which could be either larger or smaller as generally shown by the above general equation. Further, although the servo band 76 is shown to be at the center of the groups of data bands 72 for minimizing the distance between the furthermost data head and the servo tracks, the position of the servo band 76 may vary as previously described. Further, the tape 64 in this embodiment is generally known in the industry as quarter inch tape, however, the present invention is applicable to other available size tapes, such as 8 mm or 12.7 mm tape, or any other tape as would be generally known by those skilled in the art.

FIG. 8A shows multiple servo read elements 80 in six different positions with respect to the tape 64. The six different positions are shown in a lateral direction for clarity even though head assembly 62 including the multiple servo read elements 80 are moved in a direction transverse to the length of tape 64 by positioning actuator 68. In the first position (left to right in FIG. 8), the two servo read elements at one end of the multiple servo read elements 80 access the center of the servo track 85 and data element 82 accesses the first data track adjacent to the servo band 76. Likewise, in subsequent positions of the multiple servo read elements 80, various pairs of adjacent servo read elements of the multiple servo read elements 80 are positioned with respect to one of the noncontiguous servo tracks 85, 87, or 89 in order to position the data read element 82 to access the data tracks of the individual data bands 74. It is readily apparent that the data read element 82 may be either a read or write element depending upon the function to be provided by the drive and is not to be taken as limiting to the present invention.

The servo tracks 78 are spaced such that each of the servo tracks 85, 87, and 89 provide for access of six different data tracks within the individual data band 74. As illustrated, servo read elements 80 utilize servo track 85 to access the first six data tracks adjacent to the servo band 76, servo track 87 is utilized to access the second six data tracks, and servo track 89 is utilized to access the last six data tracks of the individual data band 74. The servo tracks 78 are further separated from the data bands by servo guard band 84 to prevent the misinterpretation of information in adjacent individual data bands 74 as servo information.

The method of reading and writing data on tape 64 in accordance with the present invention includes moving head assembly 62 in a direction transverse to the length of tape 64 to access one of the dedicated servo tracks 85, 87, 89 and thus the data track desired. The multiple servo read elements 80 are utilized to read the servo information identically written to the dedicated servo band to which the servo read elements 80 are proximate. The tape servo system 60 uses this servo information to determine the error between the position of head assembly 62 and the desired center position on one of the servo tracks 78. The position error information is then used to accurately position head assembly 62 utilizing positioning actuator 68. Therefore, data read/write elements are accurately positioned on the desired data tracks of the individual data bands 74 to which data can be written or from which data can be read. In general, data is written or read from the data tracks on tape 64 by moving head 62 approximately to the position where a pair of adjacent servo read elements of servo read elements 80 are positioned on the center of one of the servo tracks 78. With the utilization of adjacent servo read elements to sense the center location of the servo tracks, the width of the servo track can vary and the tolerances for the servo track dimensions can be loosened. This allows for such servo tracks to be more easily written in the field as opposed to higher tolerance writing of the servo tracks in the factory.

By spacing the centers of the servo tracks 78 multiple track pitches apart, ambiguity of track location is reduced. In other words, the separation between the servo tracks 78 is of a distance great enough such that if the head slips off track by one or more tracks, such track slipping is acknowledged. As illustrated in the various positions of the servo read elements 80, only one pair of adjacent servo elements is allowed to access one of the servo tracks 78. In other words, the servo read elements 80 become completely disengaged from one servo track, such as servo track 85, without picking up any adjacent signals from adjacent servo tracks, such as servo tracks 87 and 89.

Further, with the use of noncontiguous servo tracks, the advantage of writing to the servo tracks on a single pass with a common servo writer, as further described below, can be utilized. In addition, the number of servo read elements is reduced or the number of taps of a single magnetoresistive element is reduced with the use of multiple servo tracks.

Preferably, the servo tracks 78 are identically written such that they can be written in the field with a single pass. However, the present invention contemplates using different but similar densities to servo write each of the servo tracks in the servo band, such that track identification can be unambiguously determined. However, writing different densities would require such servo writing to be performed in a factory and not in situ, as there is insufficient room for three separate servo writers for writing the plurality of densities while still having the same gap line as the data write elements as further described below.

One alternative to using different densities in order to unambiguously determine track identification is to use the same density on all tracks but use varied physical separation to determine which servo track is being accessed. Such variable physical separation to unambiguously determine track identification is further described below with reference to FIGS. 14–16.

An alternate configuration of the servo band and adjacent individual data bands is shown in and shall be described with reference to FIG. 8B. Additional dimensional characteristics in the separation of the servo tracks and data elements can be utilized such that guard bands or gaps 386 can be used between multiple data tracks within the individual data track bands 374 along with the servo guard bands 384. Such use of gaps 386 improves the tolerance to variations in servo track placement on the tape, i.e., such as, for example, variations that may occur due to tolerances of the write elements used to write the servo tracks. Further, the use of such gaps provides a band-edge guard band wherein alternate data bands can be written in opposite directions of tape motion without encountering additional tracking error, related to direction, between adjacent data tracks within the same data band.

Figure 8B:
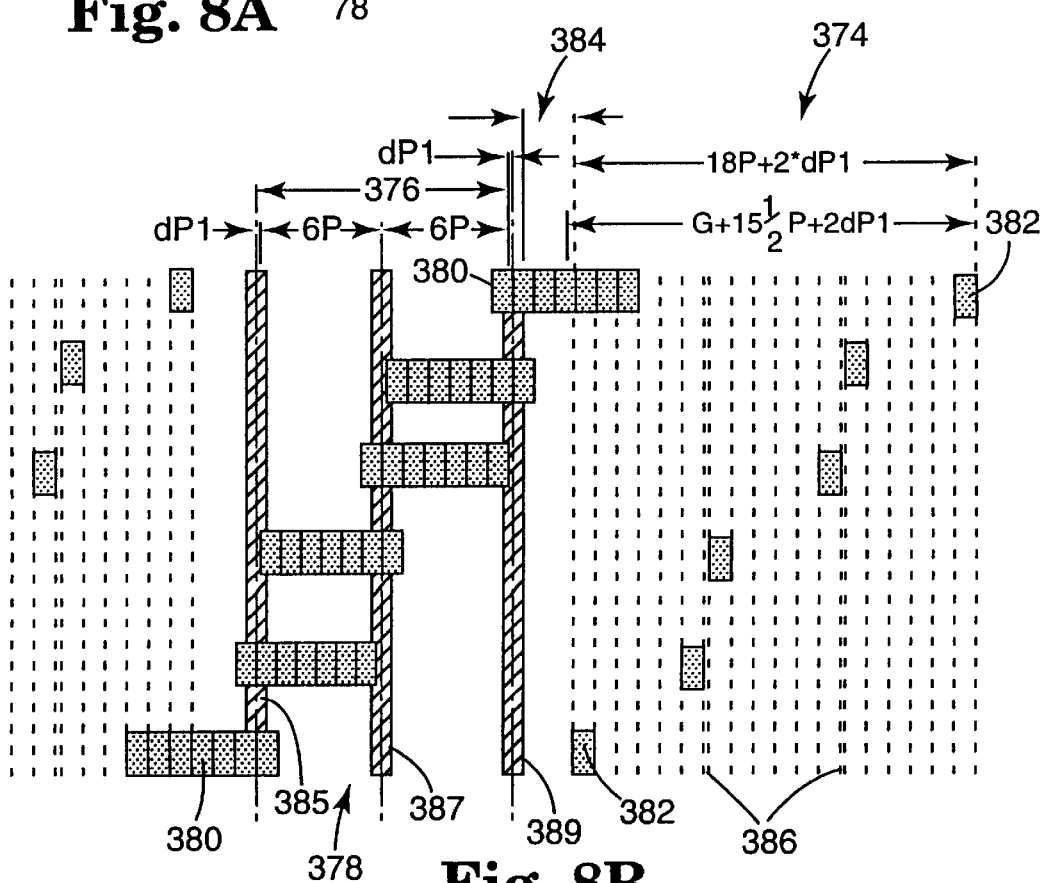
FIG. 8B is a detailed illustration of an alternate configuration of the servo band and a portion of the data bands as shown in FIG. 7.

As shown in FIG. 8B, the two outer servo tracks 385 and 389 have an additional separation from the center of servo track 387 of dP1 which is less than or equal to the data track pitch P. Therefore, the center to center separation of adjacent servo tracks is equal to (dP1+M*P), wherein M is the integer number of data track pitches between the centers of the adjacent servo tracks. The value dP1 is also the width of guard band or gap 386 and the number of gaps or guard bands 386 in the individual data bands 374 are equal to S−1, for example, S−1=2 in FIG. 8B. Further, the separation from the center line of the group of servo read elements 380 to the centerline of the adjacent data head 382 is [G+(S−1)*(M*P+dP1)+P*(H/2)] wherein G is the width of the servo guard band 384. For example, as shown in FIG. 8B, where three servo tracks are used, the center to center separation from center servo track 387 to the outer servo track 385 is (6P+dP1), i.e., M equal to six. Further, the separation from the center line of the group of servo read elements 380 to the center of the adjacent data element 382 is G+(15½*P)+(2*dP1). In addition, guard band 384 is provided such that if the servo read elements 380 move into the guard band region while active, a signal is not be picked up from the adjacent data bands.

The multiple servo read elements 80 (FIG. 8A) of the head assembly 62 are preferably provided by a tapped single magnetoresistive element. However, multiple magnetoresistive elements may also be utilized in various configurations of the present invention. The single magnetoresistive element is tapped at the data track pitch across the single element as will be described further below with respect to several embodiments thereof.

Figure 9:
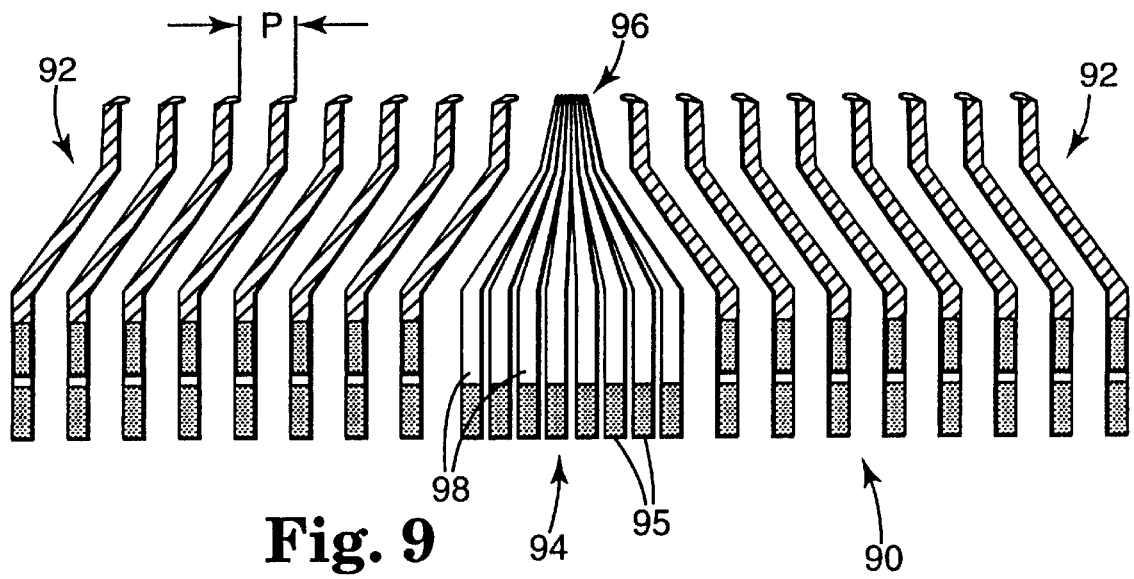
FIG. 9 is a read layer of a head assembly having a centralized servo read section embedded in data read elements.

One layer of an illustrative embodiment of a read head structure in accordance with the present invention is shown in FIG. 9. The read layer 90 of the head assembly 62 includes two groups of data read elements 92 and a centralized seven element servo read section 94. As shown, the servo read section 94 includes leads 98 extending from a servo read element end portion 96 and terminating in termination pads 95. The leads of the data elements are shown in a folded configuration wherein one lead is folded over the other lead to reduce the space necessary for accommodating the leads. However, any lead structure is contemplated in accordance with the present invention and the present invention is in no manner limited by this configuration of the data elements and leads.

Figure 10A:
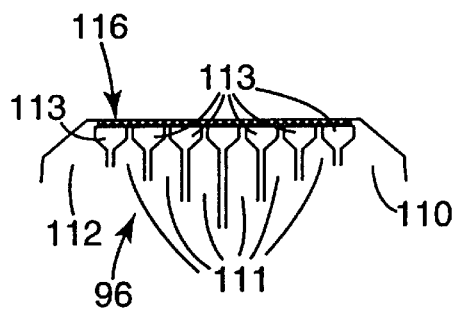
FIG. 10A is a detailed view of one portion of the servo read section as shown in FIG. 9.
Figure 10B:
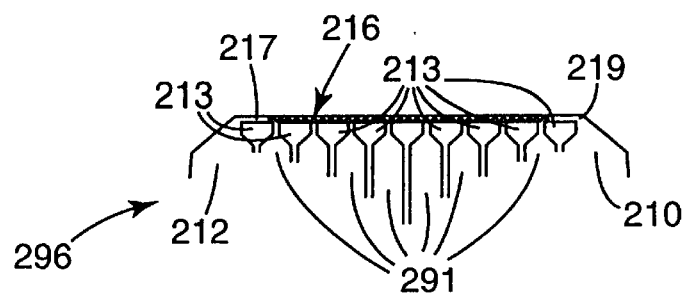
FIG. 10B is a detailed view of an alternate configuration of the servo read section as shown in FIG. 9.

The servo read element end portion 96 is shown in further detail in the alternative embodiments of FIGS. 10A and 10B. As shown in the illustration of FIG. 10A, the servo read element end portion 96 includes a single magnetoresistive element 116 which is tapped at the data track pitch by termination leads extending therefrom. As shown in FIG. 10A, such termination leads include termination tap leads 111 and input and output leads 110 and 112. The input and output leads, 110, 112 are utilized for connection to a bias voltage or current source and ground for biasing the elements. Between the outer leads 110 and 112 are six tap leads 111 positioned at the data track pitch and insulated therebetween by an insulating material 113. The single magnetoresistive element 116 is tapped so as to provide signals representative of seven servo read element segments as required for use in the illustrative embodiment described with reference to FIG. 8A. It should be readily apparent that any number of tapped elements may be provided as determined by the desired servo configuration utilized.

As shown in the alternate configuration of FIG. 10B, servo read end portion 296 includes single magnetoresistive element 216 and further includes input and output segments 217, 219 fabricated of lead structure material. The input and output segment 217, 219 are aligned with the single magnetoresistive read element 216 to control the current flow through the single magnetoresistive material of the single read element. As such, current flows in a substantially linear fashion from the input lead segment 217 to the output lead segment 219 as opposed to the embodiment of FIG. 10A wherein current does not enter the single magnetoresistive element 116 in a linear fashion but rather at somewhat of an angle. By using the input and output lead segments of FIG. 10B, the current flows more uniformly from input to output and voltages provided by the tapped segments of the single element are more uniform when exposed to the same conditions. The end portion 296 also includes insulating layers 213 isolating the leads 291, 210 and 212.

Further, by having the servo read element segments contiguously adjacent to each other, adjacent segments operate as one half of a center tapped head. Such a configuration minimizes variation in the sensitivity between two distinct read elements due to fabrication tolerances. Further, such a tapped configuration allows for the minimization of signal amplitude variations due to variations in the head to tape placement. With both the configurations of FIGS. 10A and 10B, current flow through the termination leads 111, 291, respectively, is inhibited.

Figure 13:
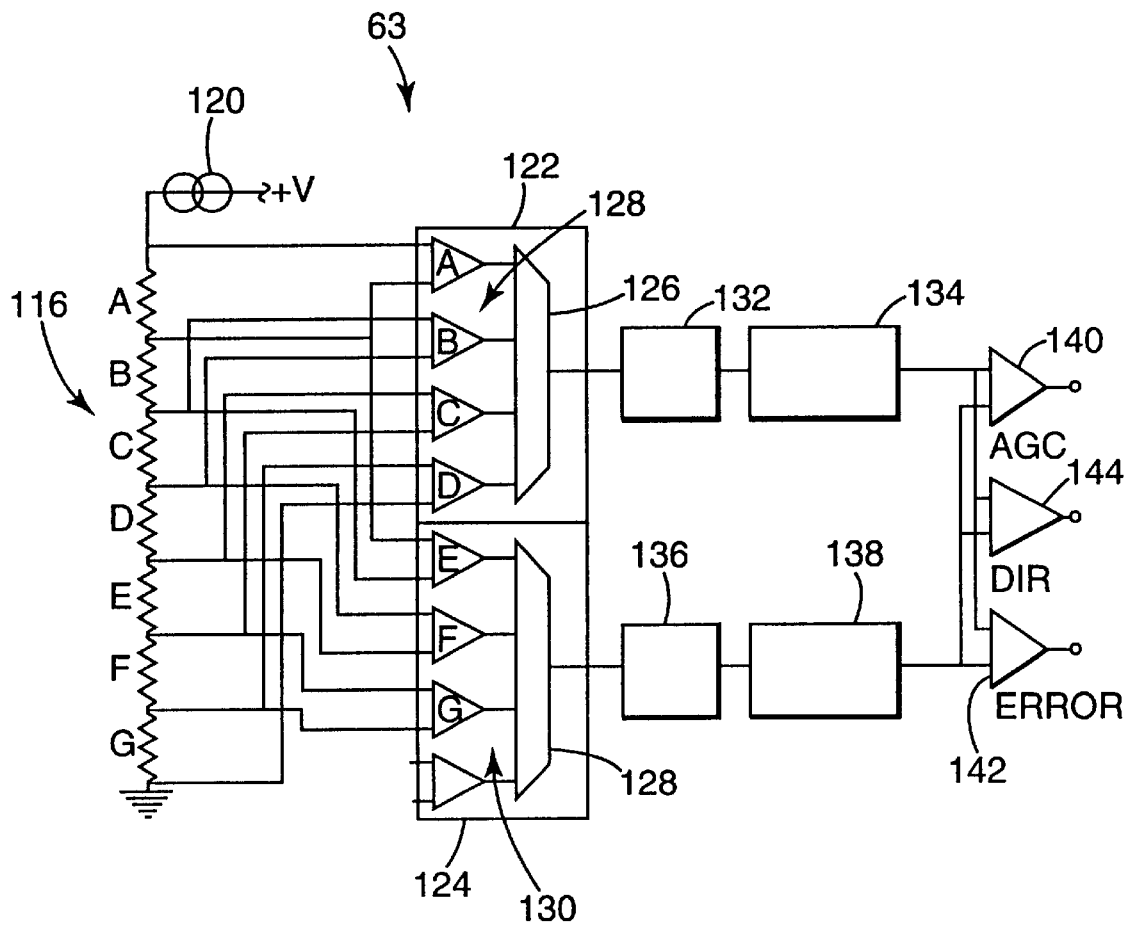
FIG. 13 is a block diagram of servo read circuitry of FIG. 1 in accordance with the present invention.

The tapped single magnetoresistive element 116 provides outputs representative of the tapped element segments of the single element 116 to servo read circuitry 63. The servo read circuitry 63 of the tape servo system 60 for terminating or receiving outputs from the multiple servo read element segments is illustrated in FIG. 13. The servo read circuitry 63 includes two banks 122, 124 of thin film amplifiers 128, 130, respectively. The outputs of the banks of amplifiers are connected to multiplexors 126 and 128 of the respective banks 122, 124. The amplifiers 128 and 130 are utilized to provide selectable outputs via the multiplexors 126 and 128 from each tapped servo read element segment of the single magneto resistive element 116. By multiplexing the individual outputs and providing outputs from each of the banks 122, 124 representative of adjacent servo read element segments, an error signal is generated by a comparison of the two outputs by differential amplifier 142.

The difference signal from the amplifier 142 is provided to signal processing unit 65 (FIG. 6), such as a digital signal processor, to provide for generation of a position error signal command to control positioning actuator 68 for movement of head assembly 62 transverse to the length of tape 64 for aligning the adjacent servo read element segments with the center of the servo track. The outputs are also summed by a summing amplifier 140 which may be utilized for providing automatic gain control. Further, a comparator 144 may be used for comparing one of the outputs to a reference or threshold to determine the transverse direction the head assembly 62 is moving relative to the tape 64.

As shown in FIG. 13, one edge of tapped servo read element segment 116A is connected to amplifier 128A of bank 122. The other edge of tapped servo read element segment 116A, which is also at the edge of segment 116B, is also connected to amplifier 128A and, in addition, to amplifier 130B of bank 124. The other edge of tapped servo read element segment 116B is connected to one input of amplifier 128C of bank 122 and further connected to the other input of amplifier 130B of bank 124. The other tapped servo read element segments 116C–116G are connected in a similar fashion to respective amplifiers of the two banks 122, 124. It should be noted that the leads of each of the servo read element segments, except for the two outer tapped servo read element segments 116A and 116G, are each connected to an amplifier of each bank 122 and 124 such that signals representative of adjacent tapped servo read element segments 116 are provided to an amplifier in opposing banks. For example, signals representative of adjacent segments 116A and 116B are provided to bank 122 and bank 124, respectively. As such the outputs of the respective banks 122, 124 are representative when selected by the respective multiplexors of adjacent servo read element segments. The outputs can then be compared to provide a position error signal with respect to the position of a pair of adjacent servo read element segments relative to the center of a servo track.

The operation of the servo system 60 shall now be described with reference to the tapped servo read element 116, representing the multiple servo read elements 80, being moved across the servo band shown in FIG. 8. As the head assembly 62 is moved transversely with respect to the length of tape 64, servo read element segments 116A and 116B are moved across the first servo track 85. As servo element 116A is moved over the servo track 85, the signal upon preamplifier 128A is increased. With only servo read element 116A positioned on servo track 85, the difference value generated by differential amplifier 142 is representative of the fact that only servo read element 116A is positioned over servo track 85. As servo read element 116B begins to move over the servo track 85 and a portion of servo read element 116A is moved off of servo track 85, the selected outputs from the bank 122 and bank 124 representative of the adjacent segments 116A and 116B get closer to being the same. The outputs of multiplexor 126 and 128 are filtered and rectified by filters 128, 136 and rectifiers 134, 138 and provided to differential amplifier 142. The differential amplifier 142 compares the outputs, and as the difference between the two outputs approaches zero, the signal processing unit 65 determines that the servo track center has been found by the differential pair of sensors, i.e., the tapped servo read elements segments 116A and 116B. Therefore, the head assembly 62 achieves servo lock on servo track 85. Thereafter, data read/write element 82 can then be utilized to read or write data to or from the first track adjacent the servo band 76. It should be noted that the number of data elements for reading and writing are numerous as shown in FIG. 7 and the head assembly of FIG. 6.

Not shown in FIG. 13 is an AC coupling capacitor or a compensation circuit in the preamplifiers required to manage the large voltage drop across each servo read element segment relative to the signal provided to the preamplifiers. For example, the signal of the tapped servo read element segment may be typically, for example, 1 to 3 percent of the DC voltage across the entire single magnetoresistive element.

It should be readily apparent that the concept of odd/even banks of amplifiers selectable to provide outputs for difference comparison utilizing tapped servo read elements may include any number of servo read element segments and any number of amplifiers depending upon the servo configuration utilized. The illustrative embodiment of FIG. 13 provides for the termination of the seven servo read element segments as utilized in conjunction with the servo configuration shown in FIG. 8A and 8B. However, the present invention is in no manner limited to this particular illustrative embodiment, but is limited only as described in the accompanying claims.

Figure 11:
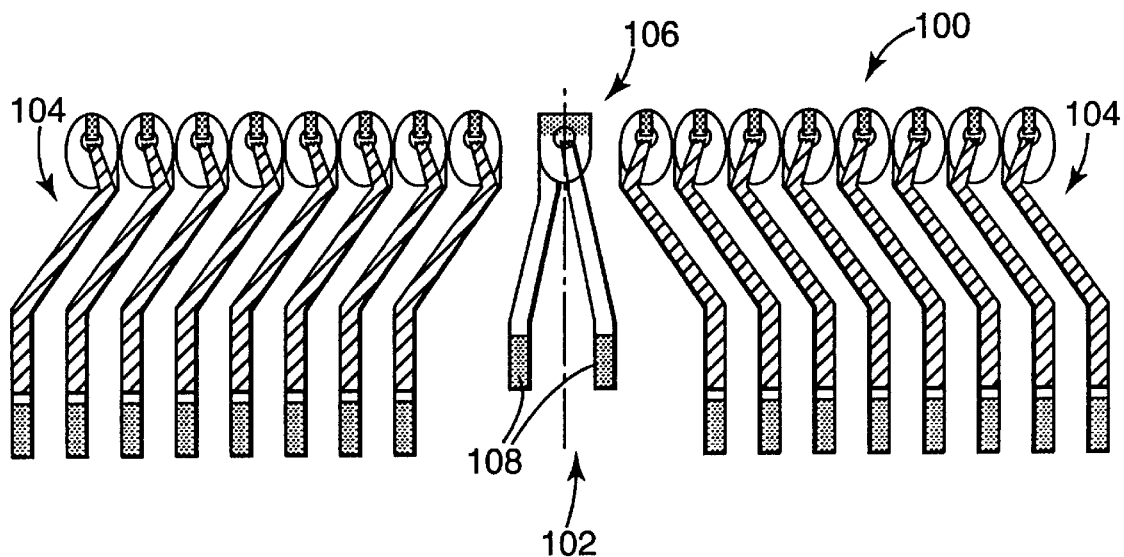
FIG. 11 is a write layer of a head assembly including a servo writer embedded in the data write elements of the head assembly.

Although the servo tracks of the various configurations may be written at the factory, it is preferable that the head assembly 62 include a servo writer 102 for writing the servo tracks in the field, i.e., in situ. Servo writer 102 in accordance with the present invention as shown in the illustrative drawing of the head assembly 62 in FIG. 6, is embedded in the data write elements 104 as shown in FIG. 11 along a common gap line 167 (FIG. 6). FIG. 11 is an illustration of a data write layer 100 of the head assembly which shows multiple data write elements 104 with the servo writer 102 centered between two groups of the data write elements 104. The servo writer 102 is offset ½ of the data track pitch from the data write elements such that the servo tracks are positioned for the servo read elements to read and properly align the data elements on the data tracks when centered.

Figure 12:
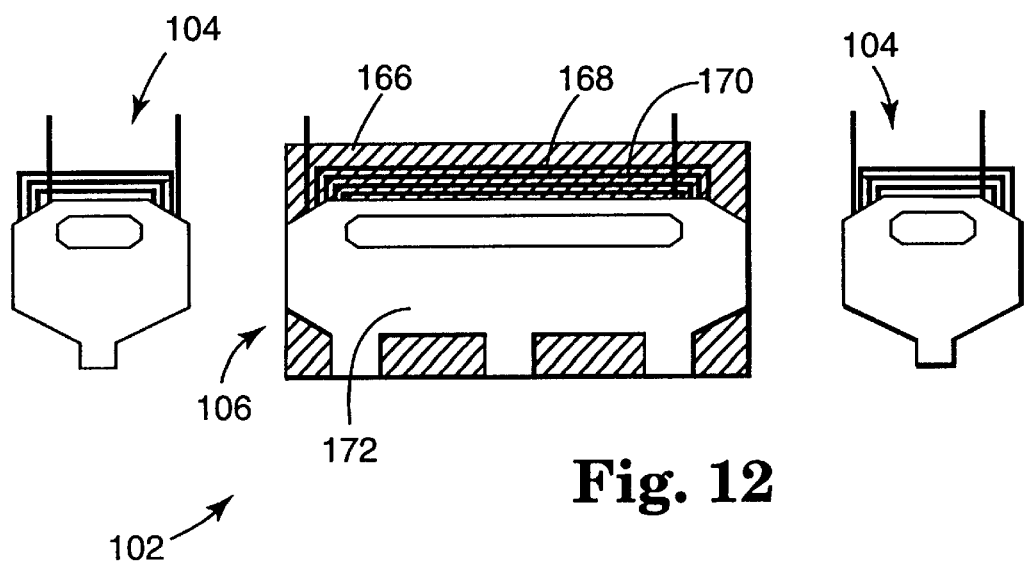
FIG. 12 is a more detailed illustration of the servo writer and a pair of adjacent data write elements as shown in FIG. 11.

The head assembly 62 is a thin film head and the servo writer 102 includes a thin film servo write comb structure 106, shown in further detail in FIG. 12 along with further detail of two adjacent data write elements 104. The servo writer further includes termination leads 108 extending therefrom.

As shown in FIG. 12, the comb structure 106 is for use in writing noncontiguous servo tracks in a single pass of the tape 64. The servo writer 102 is positioned in the center of the data elements 104 to minimize the separation of the outermost data elements from the servo band 76, although other positions of the servo band may be utilized. The data write elements 104 are uniformly separated by an integer number of data track pitches unless guard bands are utilized as shown in FIG. 8B.

The thin film servo writer 102 includes a common bottom pole 166, a continuous set of coils arranged in one or more layers 168, and a top pole 172 with two or more teeth or fingers separated for writing the servo tracks as desired for the various servo configurations described herein. A back closure 170 to the bottom pole 166 is also provided. Further, as shown in FIG. 12, the top pole 172 is recessed from the tape bearing surface by several microns to prevent recording in the region between the teeth where writing of servo information is undesired. With a common coil for the various teeth, identical servo tracks are written. As the servo tracks are written at the same time and each of the teeth have a common gap line, parallelism, and/or collinear transition, between the tracks is easily maintained.

The comb structure, as shown in FIG. 12, reflects a three finger or tooth comb such as utilized in writing the servo tracks as illustrated in FIG. 8A. The servo writer 102 occupies approximately the width of an individual data band 74. Further, the teeth of the comb-like structure 106 forming the individual write poles have a common planar gap line 167 (FIG. 6) which is the same as the data write elements 104. In an initial pass of the tape 64 across the head assembly 62, the servo information can be written to a pre-erased servo band. Typically, this is only performed once. Subsequently, all data writes or reads are made while the head assembly 62 is being servo controlled. This obviates the need for factory servo writing capability. If the servo information is inadvertently damaged, it can be rewritten by the drive using the servo writer 102.

The servo writer 102 is embedded between the data write elements with the use of common thin film processing steps. For example, with formation of the servo writer, common processing steps for forming both the top poles of the servo writer 102 and the top poles of the data write elements 104 are used. The steps of the thin film process for forming both types of write elements are common between the servo writer and the data write elements allowing the elements to share a common gap line. For example, typical common wafer level simultaneous construction of data and servo write elements includes depositing on an appropriate ceramic substrate such as alumina titanium-carbide ($Al_2O_3TiC$) the first or bottom pole layer of high-moment, low coercivity magnetic material, such as permalloy, NiFe, or cobalt zirconium tantalum (CZT). An insulating, gap forming layer of alumina ($Al_2O_3$) is then deposited. Using photolithography techniques, one or more layers of coils, displaced from where the front gap will be formed by lapping, are plated with the requisite insulation layers of baked photoresist. A top smoothing layer of baked photoresist above the coils is deposited and a layer of the same magnetic material used for the first magnetic layer is deposited thereon to form the top pole. A thick layer of alumina, sufficiently thick to allow lapping of the film side of the substrate to form a planar surface, is deposited and the film side of the wafer is lapped to achieve a planar surface.

Likewise, the servo read elements can be embedded in the data read elements with the use of common thin film processing steps. The steps of the thin film process for forming both types of read elements are common between the servo read elements and the data read elements allowing for common formation and common gap lines for the servo read elements and data read elements as shown in FIG. 9. For example, typical common wafer level simultaneous construction of data or servo read elements includes depositing on an appropriate ceramic substrate, such as alumina titanium-carbide ($Al_2O_3TiC$), a first shield layer of high permeability, low coercivity magnetic material, such as permalloy, NiFe, or cobalt zirconium tantalum (CZT). An insulating, gap forming layer of alumina ($Al_2O_3$) is then deposited. Using photolithography techniques, a patterned magnetoresistive read sensor sandwich consisting of very thin films of permalloy and magnetic and non-magnetic layers is deposited. A second alumina layer is then deposited and a layer of the same magnetic material used for the first magnetic layer is deposited thereon to form the top shield. Thereafter, a thick protective layer of alumina is deposited and lapped to a planar surface.

Although increased servo track spacing reduces the ambiguity in identification of servo tracks and thus reduces the likelihood of misidentification due to a head slipping off track by one or more servo tracks, some ambiguity may still exist. Ambiguity of servo track identification can be eliminated by using identically written servo tracks but using different varied physical separations between the servo tracks to determine which servo track is being accessed. Such physical separation to unambiguously determine servo track identification is described below with reference to the alternate servo configurations shown in FIGS. 14–16. By providing variable spacing between pairs of servo tracks which can be written identically and simultaneously, each servo track can be uniquely identified utilizing contiguously configured servo read elements even though none of the servo tracks have distinguishing characteristics, i.e., such as, for example, varied frequency, density.

Positive track identification with use of a single pass servo writer can be achieved by coding the layout of the servo tracks, i.e., to provide differentiated spacing between two or more servo track pairs or each servo track pair. One form of this is to increase the spacing one track pitch between each subsequent pair of servo tracks as described further below which can be written with a servo writer similar to that of FIG. 12 with spacing differentials between the teeth of the writer.

Figure 14:
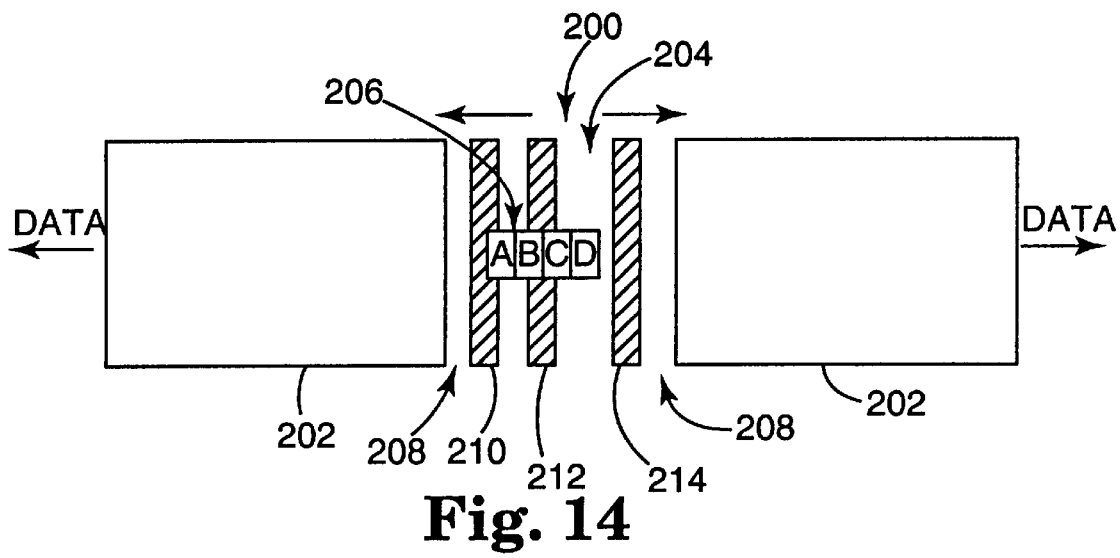
FIG. 14 is an alternate servo read element and servo track configuration in accordance with the present invention.

A variable spaced servo track configuration using the differentiated spacing set forth above is shown in FIG. 14. The servo system configuration includes data bands 202 with a servo band 200 positioned at the center therebetween. The servo band 200 includes servo tracks 204 and multiple servo read elements 206. In accordance with the present invention, the center to center spacing between servo tracks of the adjacent servo track pair 210, 212 is about two data track pitches, and the center to center spacing between servo tracks of the servo track pair 212, 214 is about three data track pitches.

The guard bands 208 separate the coded servo tracks 204 from the data bands 202 to allow the signal from the data band to be sufficiently reduced so as not to be interpreted as a servo signal accessible by the servo read elements. However, guard bands on the edges of the servo band 200 are typically not required if the servo tracks are written simultaneously and identically with the same monofrequency which is substantially different from the data frequencies.

Figure 15:
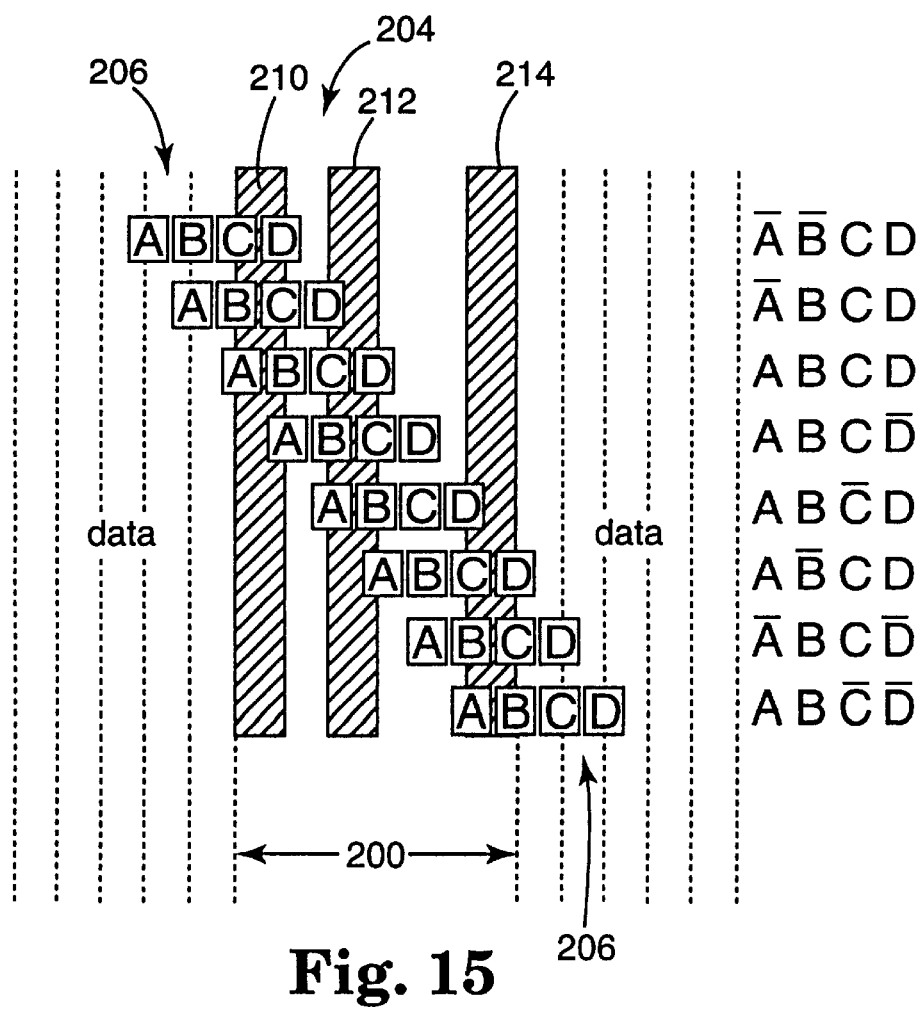
FIG. 15 is a more detailed view of the alternate servo read element and servo track configuration as shown in FIG. 14.

The servo track configuration as shown in FIG. 14 is shown in further detail in FIG. 15 minus the guard bands 208. Adjacent to the servo band 200 and various positions of servo read elements 206, as shown in FIG. 14, is an algebraic code which illustrates the uniqueness of each position of the servo read elements 206 with respect to the differentially spaced servo tracks 204. As shown in FIG. 15, a monotonically increasing separation between servo tracks of pairs of adjacent servo tracks by an additional track from one servo track pair to a subsequent pair of servo tracks is shown. However, other codes may also be used. For example, the code could be a binary code of spacings of 1, 2, 4, 8 . . . between subsequent pairs of tracks or the pairs of adjacent servo tracks may be spaced at random. Further, multiples of the track pitch interval spacing may also be utilized.

In operation, as illustrated in FIG. 15, servo read elements C and D are moved to a position whereat signals are received by servo read circuitry from servo read elements. The servo read circuitry may be similar to servo read circuitry 63, but any circuitry which can sense the position of adjacent servo read elements relative to the servo tracks may be utilized. The signals representative of each the multiple servo elements 206 may be multiplexed or cycled through to determine the adjacent servo read elements that are positioned adjacent a servo track. After adjacent servo read elements have locked on a particular servo track, such as elements C and D locking on the center of servo track 210, the outputs representative of each of the multiple servo read elements are cycled through to identify which servo track the elements C and D have locked on. For example, when the servo elements C and D have locked on servo track 210, the outputs of the multiple servo elements correspond to the code $\overline{AB}CD$. The outputs are provided to a drive processing unit with which the head assembly 62 is utilized. In this manner, it is determined by the drive processing unit that the adjacent servo read elements C and D are locked onto servo track 210. As similarly described previously with respect to the operation of the tapped servo read elements with reference to FIG. 8A, when elements C and D are positioned such that the signals therefrom are equal, the center of servo track 210 is detected and servo lock is achieved. Reading and writing functions may then be performed.

As the servo read elements 206 are moved proximate the other servo tracks 212 and 214, unique codes also identify which servo tracks the elements are locked onto. For example, in the last position shown, elements A and B are adjacent servo track 214 and the unique code $AB\overline{CD}$ are used to identify servo track 214. As such, in each position of the servo elements A, B, C, and D, a different code is available so as to unambiguously identify the servo track to which the pair of adjacent servo elements are locked.

Figure 16:
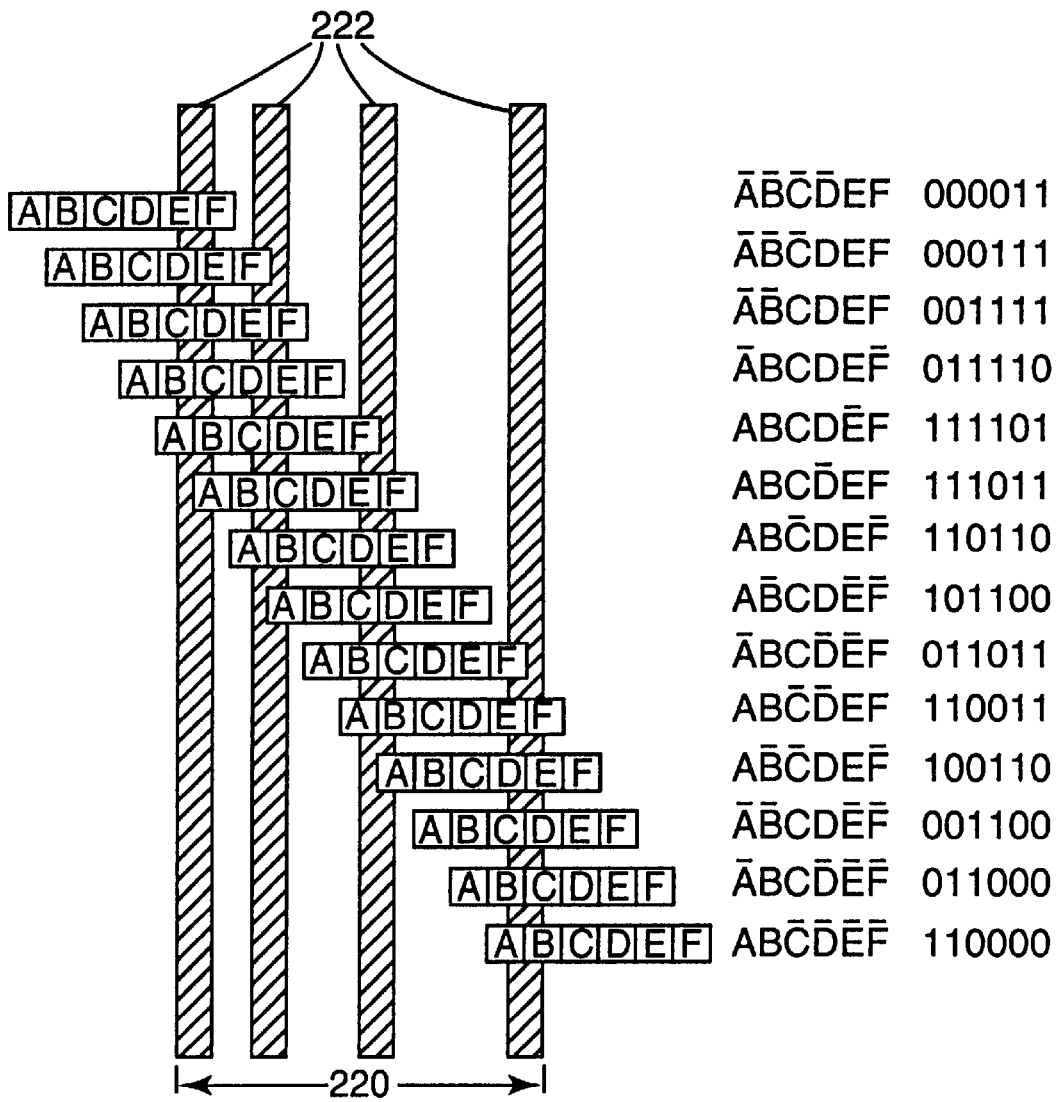
FIG. 16 is a further configuration showing the spacing of servo tracks as the number of servo tracks in the configuration of FIG. 14 is increased.

FIGS. 16 illustrates the progression for the next set of increased data tracks per servo band. For example, if a number of data tracks in a data band is 10, then the number of servo tracks 222 in servo band 220 is four with a center to center separation between the furthest apart servo bands being four data track pitches as shown in FIG. 16. As such, fourteen algebraic codes are available for illustrating the unique position of six servo read elements with respect to the servo tracks 222.

In general, the number of servo read elements for use in the variably spaced servo track configurations is equal to at least K+1, wherein K is equal to the number of track pitches between the centers of the servo tracks for the pair of adjacent servo tracks which are farthest apart. For example, as shown in FIG. 15, the number of track pitches between the centers of the servo tracks 212 and 214 is three. Therefore, the number of servo read elements 206 required is at least four. Likewise, with the center to center spacing between the pair of servo tracks farthest apart being four track pitches, the minimum number of servo read elements is at least five. However, as shown in FIG. 16, in order to provide unique codes for each of the possible servo read element positions in the servo band to service individual data bands of 10 data tracks, at least 6 servo read elements are necessary.

It should be readily apparent that the various elements as described with respect to the present invention may be utilized separately, together in a system, or with other servo configurations, and the present invention is limited only in accordance with the accompanying claims. For example, the differentially spaced servo track configurations as described with respect to FIGS. 14–16 may be utilized with servo read elements that are formed from a tapped single magnetoresistive element or may further include a servo read element configuration wherein such elements are not tapped, but rather separate heads are used. Further, for example, the servo writer which may be utilized to form a single pass to write the noncontiguous servo tracks at a mono-frequency as described herein need not be a part of the head assembly. Such servo tracks may be written in the factory as opposed to being written in situ. Likewise, the servo read circuitry, as previously described, may be utilized in conjunction with the variably spaced servo track configurations described with respect to FIGS. 14–16 with modifications as would be known to one skilled in the art.

Although the present invention has been described with reference to particular embodiments, one skilled in the art will recognize that changes and modifications may be made in form and detail therewith without departing from the scope of the invention as described in the accompanying claims.

What is claimed is:

1. A tape servo system, the system comprising:

tape including a plurality of bands of tracks, the plurality of bands of tracks including at least one data band having a plurality of data tracks of track pitch P and a servo band dedicated for servo information, the servo band including two or more noncontiguous servo tracks, each pair of neighboring servo tracks of the two or more noncontiguous servo tracks has a center to center separation equal to M*P, wherein M for each pair of neighboring servo tracks may be any integer $\geq 2$;

a head assembly including a single magnetoresistive read element tapped provide at least (K+1) tapped servo read elements for use in reading servo information written to the servo band, wherein K is equal to the integer M for the pair of neighboring servo tracks having the greatest center to center separation; and a repositioning assembly for repositioning the head assembly as a function of the servo information read form the servo band using the servo read elements.

2. The system according to claim 1, wherein the spacing between the servo tracks of each neighboring pair of the two or more noncontiguous servo tracks is at least about 0.7 P and each servo track has a width that is >P.

3. The system according to claim 1, wherein the single magnetoresistive element is tapped at a spacing equal to the data track pitch.

4. The system according to claim 3, wherein the single magnetoresistive element is centered between two groups of data elements and has the same gap line as the two groups of data elements.

5. The system according to claim 3, wherein the single magnetoresistive element is tapped by a plurality of tap leads at a spacing equal to the data track pitch and an input lead and an output lead at respective ends of the single magnetoresistive read element.

6. The system according to claim 5, wherein the input and output leads include a lead segment extending in line with the single magnetoresistive read element.

7. The system according to claim 5, wherein the system further includes a first bank of amplifiers and a second bank of amplifiers, the tap leads tapping the single magnetoresistive element are connected to the first and second bank of amplifiers such that each tapped servo element between end tapped servo elements of the single magnetoresistive read element are connected to an amplifier of each of the first and second banks, amplifiers of the first and second banks are selected for providing outputs therefrom representative of servo information of adjacent tapped servo read elements, the system further including means for comparing the selected outputs from the first and second banks of amplifiers and providing a difference signal for use in repositioning the head assembly.

8. The system according to claim 1, wherein each data band includes N data tracks, wherein the number of tapped servo read elements is equal to H, wherein the number of servo tracks is equal to S, and further wherein $S*(H-1) \geq N$.

9. The system according to claim 8, wherein the at least one data band includes at least two groups of data tracks separated by a gap, the number of gaps equal to S−1 with each gap having a width dP1, wherein the head assembly further includes a plurality of data elements including at least one data element positioned at a distance in a data band adjacent the servo band, the adjacent data band being separated from an outermost servo track in the servo band by a servo guard band, and wherein the spacing of each pair of neighboring servo tracks is (dP1+M*P) and the spacing from the centerline of the servo read elements to the center of the adjacent data element is of a value equal to $[G+(S-1)*(M*P+dP1)+P*(H/2)]$, wherein dP1 is less than P and wherein G is the width of the servo guard band and $\geq 0$.

10. The system according to claim 1, wherein the two or more noncontiguous servo tracks include at least three noncontiguous servo tracks, and further wherein the center to center separation between pairs of neighboring servo tracks of the at least three noncontiguous servo tracks is different for at least two pairs of neighboring servo tracks.

11. The system according to claim 10, wherein the number of servo read elements (H) is equal to at least K+1, wherein K is the number of track pitches between the centers of two servo tracks of a pair of neighboring servo tracks having the greatest center to center separation.

12. The system according to claim 1, wherein the two or more noncontiguous servo tracks include at least three noncontiguous servo tracks, and further wherein the center to center separation between pairs of neighboring servo tracks of the at least three noncontiguous servo tracks is different for each pair of neighboring servo tracks across the servo band.

13. The system according to claim 12, wherein the separation between pairs of neighboring servo tracks increases by one or more track pitches from one pair of neighboring servo tracks to a subsequent pair of neighboring servo tracks across the servo band.

14. The system according to claim 1, wherein the head assembly includes a plurality of servo write elements for identically writing the plurality of servo tracks in a single pass.

15. The system according to claim 14, wherein the head assembly includes data write elements, the servo write elements having the same gap line as the data write elements.

16. A tape servo system, the system comprising:
tape including a plurality of bands of tracks, the plurality of bands of tracks including at least one data band having a plurality of data tracks of track pitch P and a servo band dedicated for servo information, the servo band including two or more noncontiguous servo tracks, each pair of neighboring servo tracks of the three or more noncontiguous servo tracks has a center to center separation equal to M*P, wherein M is any integer $\geq 2$, the center to center separation between pairs of neighboring servo tracks of the three or more noncontiguous servo tracks is different for at least two pairs of neighboring servo tracks;
a head assembly including a plurality of servo read elements (H) for use in reading servo information written to the servo band, the number of servo read elements (H) equal to at least K+1, wherein K is the number of track pitches between the centers of the two servo tracks of a pair of neighboring servo tracks having the greatest center to center separation; and
a repositioning assembly for repositioning the head assembly as a function of the servo information read form the servo band using the plurality of servo read elements.

17. The system according to claim 16, wherein the center to center separation between pairs of neighboring servo tracks is different for each pair of neighboring servo tracks across the servo band.

18. The system according to claim 17, wherein the separation between pairs of neighboring servo tracks is different by one or more track pitches from one pair of neighboring servo tracks to a subsequent pair neighboring of servo tracks across the servo band.

19. The system according to claim 18, wherein the center to center separation between pairs of neighboring servo tracks monotonically increases by one track pitch from one pair of neighboring servo tracks to a subsequent pair of neighboring servo tracks across the servo band.

20. The system according to claim 16, wherein the servo read elements are tapped servo read elements of a single magnetoresistive element that is tapped at a spacing equal to the data track pitch.

21. The system according to claim 20, wherein the single magnetoresistive element is tapped by a plurality of tap leads at a spacing equal to the data track pitch and an input lead and an output lead at respective ends of the single magnetoresistive read element.

22. The system according to claim 21, wherein the system further includes a first bank of amplifiers and a second bank of amplifiers, the tap leads tapping the single magnetoresistive read element are connected to the first and second bank of amplifiers such that each tapped servo element between end tapped servo elements of the single magnetoresistive read element are connected to an amplifier of each of the first and second banks, amplifiers of the first and second banks are selected to provide outputs therefrom representative of servo information of adjacent tapped servo read elements, the system further including means for comparing the selected outputs from the first and second banks of amplifiers and providing a difference signal for use in repositioning the head assembly.

23. The system according to claim 18, wherein each data band includes N data tracks, wherein the number of servo read elements is equal to H, wherein the number of servo tracks is equal to S, and further wherein $S*(H-1) \geq N$.

24. The system according to claim 16, wherein the head assembly incudes a plurality of servo write elements for identically writing the plurality of servo tracks in a single pass.

25. A servo tracking data recording tape, the tape comprising:
- at least one data band having a plurality of data tracks of track pitch P;
- a servo band dedicated for servo information, the servo band including three or more noncontiguous servo tracks, wherein a first pair of neighboring servo tracks of the three or more noncontiguous servo tracks has a center to center separation equal to $M_1*P$, wherein $M_1$ is any integer $\geq 2$, and wherein a second pair of neighboring servo tracks of the three or more noncontiguous servo tracks has a center to center separation equal to $M_2*P$, wherein $M_2$ is any integer $\geq 2$, and wherein $M_1 \neq M_2$.

26. The tape according to claim 25, wherein the center to center separation between pairs of neighboring servo tracks of the three or more noncontiguous servo tracks is different for each pair of neighboring servo tracks across the servo band.

27. The tape according to claim 26, wherein the center to center separation between pairs of neighboring servo tracks is different by one or more track pitches from one pair of neighboring servo tracks to a subsequent pair of neighboring servo tracks across the servo band.

28. The tape according to claim 27, wherein the center to center separation between pairs of neighboring servo tracks monotonically increases by one track pitch from one pair of neighboring servo tracks to a subsequent pair of neighboring servo tracks across the servo band.

29. The tape according to claim 25, wherein each servo track has a width that is >P.

30. The tape according to claim 25, wherein each data band includes N data tracks, wherein a system for use with the N data tracks includes a number of servo read elements equal to H, wherein the number of servo tracks is equal to S, and further wherein $S*(H-1) \geq N$.

31. A system for writing servo track information within a servo band of a tape, the system comprising:
- tape including a plurality of bands of tracks, the plurality of bands of tracks including at least one data band having a plurality of data tracks of track pitch P and a servo band dedicated for servo information; and
- a head assembly including a plurality of data write elements and a servo writer having the same gap line as the plurality of data write elements, the servo writer for writing three or more noncontiguous servo tracks in the servo band, wherein a first pair of neighboring servo tracks of the three or more noncontiguous servo tracks has a center to center spacing equal to $M_1*P$, wherein $M_1$ is any integer $\geq 2$, and wherein a second pair of neighboring servo tracks of the three or more noncontiguous servo tracks has a center to center spacing equal to $M_2*P$. wherein $M_2$ is any integer $\geq 2$, and wherein $M_1 \neq M_2$.

32. The system according to claim 31, wherein the head assembly includes two groups of data write elements, the servo writer embedded at the center of the two groups.

33. The system according to claim 31, wherein the servo writer includes a comb-like single pass writing structure including teeth having a common gap line, the number of teeth being equal to the number of servo tracks to be written, each tooth being equal to the width of the plurality of servo tracks.

34. The system according to claim 33, wherein the servo write elements include a common coil.

35. The system according to claim 33, wherein the teeth of the comb-like structure have a center to center spacing between pairs of adjacent teeth that is different for at least two pairs of adjacent teeth.

36. The system according to claim 31, wherein the head assembly further includes a servo erase head along another gap line for erasing the servo band.

37. A method of servo track identification, the method comprising the steps of:
- providing three or more noncontiguous servo tracks, wherein a first pair of neighboring servo tracks of the three or more noncontiguous servo tracks has a center to center separation equal to $M_1*P$, wherein $M_1$ is any integer $\geq 2$, and wherein a second pair of neighboring servo tracks of the three or more noncontiguous servo tracks has a center to center separation egual to $M_2$, wherein $M_2$ is any integer $\geq 2$, and wherein $M_1 \neq M_2$;
- providing at least K+1 servo read elements, wherein K is the number of track Ditches between the centers of two servo tracks of a pair of neighboring servo tracks of the plurality of noncontiguous servo tracks having the greatest center to center separation; and
- sensing whether the servo read elements of at least one pair of neighboring servo read elements are positioned proximate to the center of at least one of the servo tracks.

38. The method according to claim 37, further including the step of comparing the sensed information to a predetermined algebraic code identifying each servo track.

39. The method according to claim 38, wherein the separation between pairs of neighboring servo tracks is different for each pair of neighboring servo tracks of the plurality of noncontiguous servo tracks across the servo band.

40. The method according to claim 39, wherein the separation between pairs of neighboring servo tracks increases by one or more track pitches from one pair of neighboring servo tracks to a subsequent pair of neighboring servo tracks across the servo band.

41. A method of reading servo information, the method comprising the steps of:
- providing a tape including a plurality of bands of tracks, the plurality of bands of tracks including at least one data band having a plurality of data tracks of track pitch P and a servo band dedicated for servo information, the servo band including two or more noncontiguous servo tracks, each pair of neighboring servo tracks of the two or more noncontiguous servo tracks having a center to center spacing equal to $M*P$, wherein M for each pair of neighboring servo tracks may be any integer $\geq 2$;
- positioning a tapped single magnetoresistive read element proximate the tape to provide K+1 tapped servo read element signals representative of K+1 servo read elements, wherein K is equal to an integer M of the pair of neighboring servo tracks having the greatest center to center separation; and
- cycling selectively through the K+1 tapped servo read element signals representative of the tapped servo read elements to provide a pair of outputs representative of the position of neighboring servo read elements of the tapped servo read elements relative to one or more of the noncontiguous servo tracks; and
- comparing the pair of outputs to determine a position error signal as a function thereof.

* * * * *

UNITED STATES PATENT AND TRADEMARK OFFICE
CERTIFICATE OF CORRECTION

PATENT NO.: 5,946,156
DATED: August 31, 1999
INVENTOR(S): Schwarz et al.

It is certified that error appears in the above-identified patent and that said Letters Patent is hereby corrected as shown below:

Column 1, line 54, "servo band" should read --servo band 20--.

Column 16, line 46, "provide" should read --to provide--.

Column 20, line 14, "egual" should read --equal--.

Column 20, line 17, "Ditches" should read --pitches--.

Signed and Sealed this

Third Day of April, 2001

Attest:

NICHOLAS P. GODICI

*Attesting Officer*   *Acting Director of the United States Patent and Trademark Office*